2 Sheets—Sheet 1.

L. W. STOCKWELL,

Assignor to A. ADAMS.

AUTOMATIC HOSE REEL.

No. 10,412. Reissued Nov. 27, 1883.

Levi W. Stockwell

WITNESSES

INVENTOR

By Leggett & Leggett

ATTORNEYS

N. PETERS, Photo-Lithographer, Washington, D. C.

2 Sheets—Sheet 2.

L. W. STOCKWELL,

Assignor to A. ADAMS.

AUTOMATIC HOSE REEL.

No. 10,412. Reissued Nov. 27, 1883.

WITNESSES

O. Engel

C. H. Dorer

Levi W. Stockwell

INVENTOR

By Leggett & Leggett

ATTORNEYS

N. PETERS, Photo-Lithographer, Washington, D. C.

UNITED STATES PATENT OFFICE.

LEVI W. STOCKWELL, OF CLEVELAND, OHIO, ASSIGNOR TO ALFRED ADAMS, OF SAME PLACE.

AUTOMATIC HOSE-REEL.

SPECIFICATION forming part of Reissued Letters Patent No. 10,412, dated November 27, 1883.

Original No. 261,882, dated August 1, 1882. Application for reissue filed March 12, 1883.

*To all whom it may concern:*

Be it known that I, LEVI W. STOCKWELL, a citizen of the United States, residing at Cleveland, in the county of Cuyahoga and State of Ohio, have invented certain new and useful Improvements in Automatic Hose-Reels, of which the following is a specification.

My invention relates to that class of apparatus in which the unwinding of the hose from the reel automatically turns on the water.

The subject-matter claimed is hereinafter specifically designated.

Figure 1:
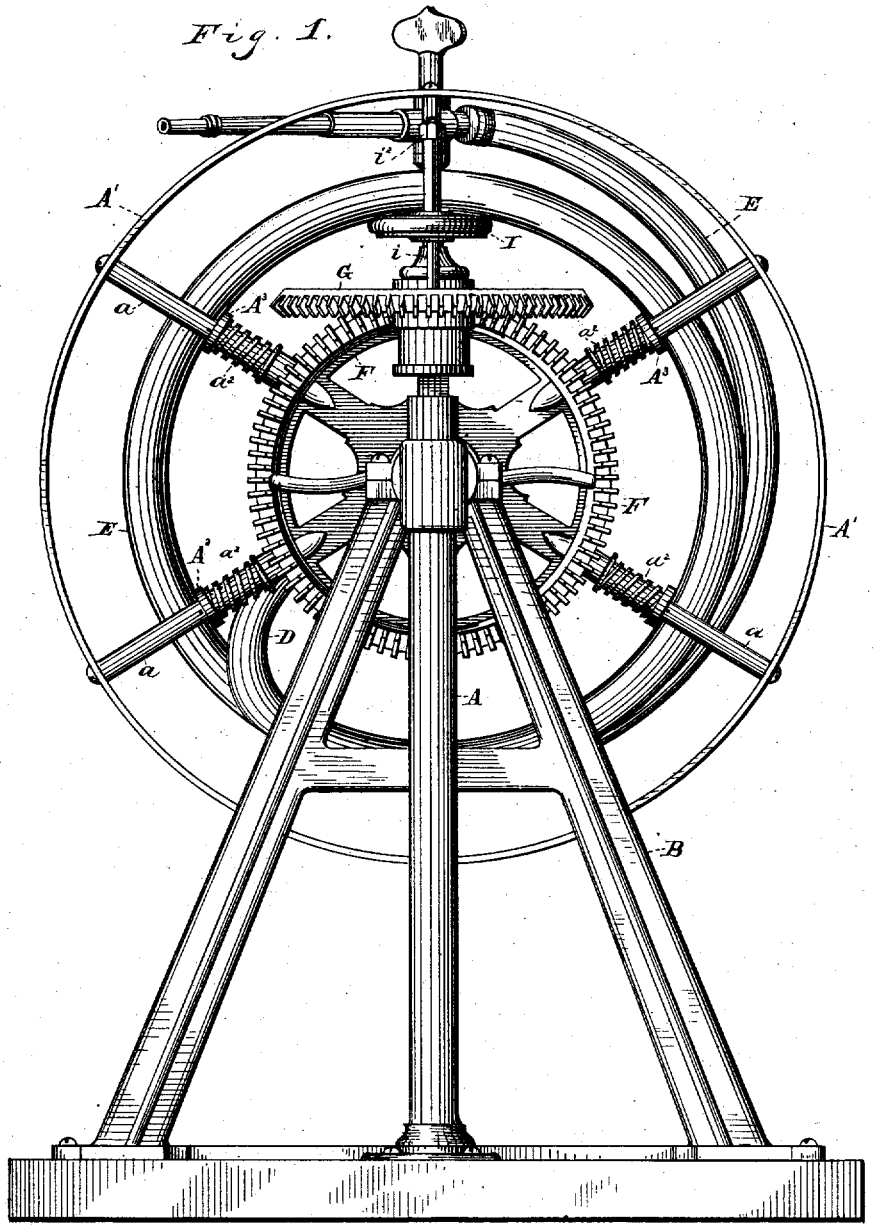
Figure 2:
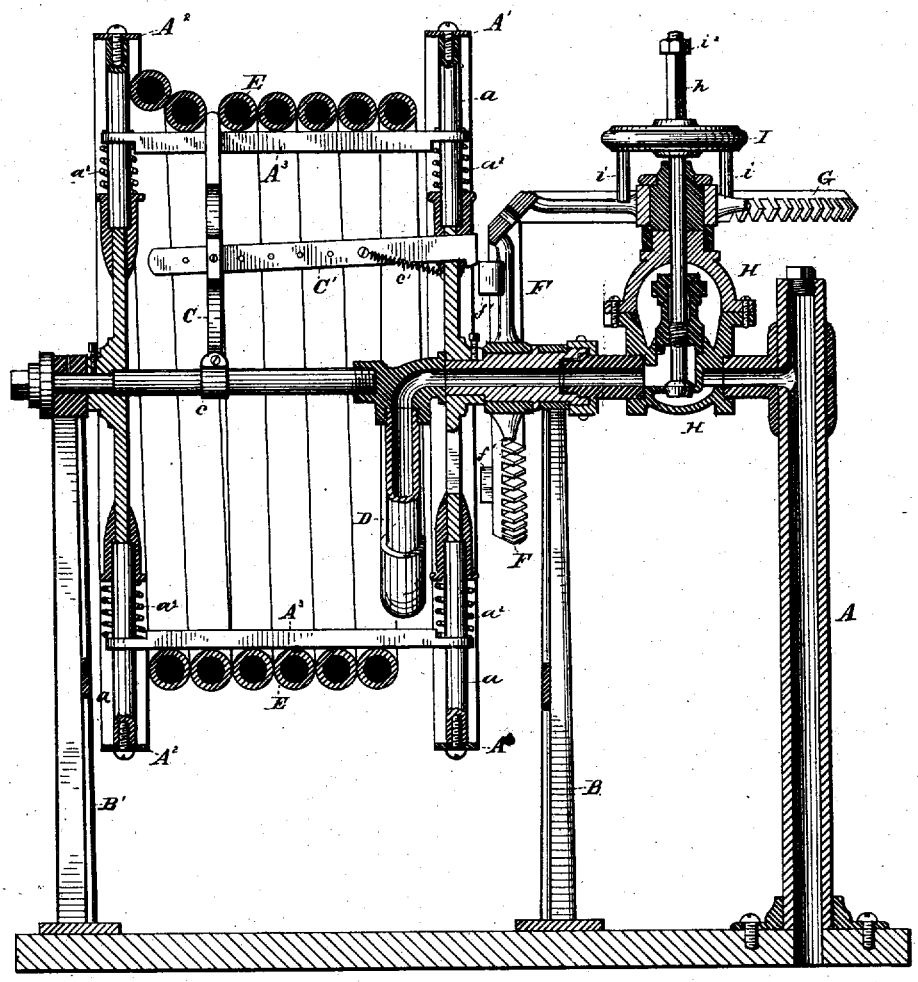

In the accompanying drawings, which represent one convenient form of attaining the object of my invention, Figure 1 represents an end elevation, and Fig. 2 a vertical central longitudinal section through my improved apparatus.

The water-supply pipe A constitutes one bearing of the hose-reel, mounted upon suitable brackets or standards, B B′. The sides of the reel consist of wheels A′ $A^2$, provided with radial spokes *a*, upon which reel-bars $A^3$ slide freely to and from the axle, being pressed outward by coiled springs $a^2$ to render the reel expansible. A lever, C, connected with the reel-shaft by a pin-joint, *c*, which permits it to swing in a plane parallel with the reel-shaft, is forked at its outer extremity, the prongs of the fork projecting slightly beyond one of the reel-bars, which it embraces. A bar, C′, pin-jointed on this lever intermediate of its length, extends parallel with the reel-shaft and projects through one of its sides, A′. This bar is adjustable longitudinally in the lever C by holes and pins, slots and screws, or other well-known devices, and is provided with a spring, *c′*, which tends to keep it projected beyond the face of the reel. The water-supply pipe extends through the reel-bearing, and is connected by an elbow-pipe or goose-neck, D, with the hose E.

The mechanism thus far described is old and well known, though in form somewhat different from that herein shown.

An actuating-gear, F, turns freely on the water-supply pipe or reel-bearing, and is provided with lugs *f′ f′*, against which the projecting end of the spring-detent C′ abuts at the proper time to actuate it. These lugs are made square on one side, so that the detent will engage with them when the reel is turned in the direction to unwind the hose, but are beveled or chamfered on the opposite side, so that when the reel is turned to wind up the hose the spring-detent will be snubbed back without affecting the gearing. Instead of the spring-detent, other well-known forms of detachable connection between the hose-reel and actuating-gear might be employed. The actuating-gear F meshes with a corresponding pinion, G, turning loosely upon the projecting stem *h* of the water-supply valve H, of well-known construction, mounted in a suitable yoke or frame upon the water-supply pipe. The stem or spindle of this valve is made polygonal in shape to receive a hand-wheel, I, which has a free vertical movement upon the spindle of the valve, and rests upon a shoulder on the spindle, so as to rise with it. Pins *i* and *i′* project from the under face of this hand-wheel, and when the hose is wound up and the valve closed they project downward between the spokes of the pinion G. When, therefore, the pinion G is turned by the action of the reel in unwinding the hose, the hand-wheel I and wheel G are caused to move together, revolving the valve-stem *h* and opening the valve. The valve-stem rises in revolving to open the valve, and carries the hand-wheel I with it until the valve is fully open, at which point the pins *i* and *i′* are raised above and released from the spokes of the pinion G, so that the reel can revolve without affecting the valve till the desired quantity of hose is unwound.

To close the valve, the hand-wheel I should be raised on the valve-spindle until its upward movement is arrested by the nut $i^2$ on the upper end of the spindle, when the pins *i* and *i′* will be elevated sufficiently above the pinion G to enable the valve to be fully closed by the turning of the hand-wheel before the pins again come in contact with the spokes of the pinion G. When the valve is so closed and the hand-wheel released, it drops downward upon the valve-stem, the pins *i* and *i′* again projecting downward between the spokes of the pinion G, when the valve, with its actuating mechanism, is again in position to be opened by the revolution of the reel if turned in the direction necessary to unwind the hose. When the reel is turned in the opposite direction to wind up the hose, the beveled sides of the lugs $f'$ snub back the spring-detent C′, so that the valve is not affected by the rotation of the reel.

Should it be desired, for any reason, to open the valve without revolving the reel, it may be done by turning the hand-wheel after lifting it out of engagement with the gear-wheel G. By removing the nut $i^2$ and reversing the hand-wheel, the valve will be entirely disconnected from the automatically-operating devices, and may be opened and closed by hand only.

Ordinarily the hose remains wound upon the reel with the supply-valve closed, and with the forked lever C of the spring-detent C′ drawn back to hold the detent out of engagement with the lugs $f'$ and resting between two adjacent coils of the hose, according to the point at which it is desired to turn on the water-supply, the valve-stem and its actuating-gear being locked together in the manner above described. While in this position the reel may be turned freely in either direction without actuating the valve-opening mechanism. As soon as enough hose is unwound to release the spring-detent it is thrust forward beyond the face of the reel, and comes in contact with one of the studs $f'$ upon the actuating-gear, thus turning it and the second gear-wheel, G, which in turn opens the valve, thus turning on the water automatically.

The gears above described are represented as miter-wheels; but other well-known forms of gearing may obviously be substituted with good effect.

I am aware that automatic hose-reels have been provided with a stop-cock for regulating the supply of water to the hose, said stop-cock being located in a hollow axle forming the supply-conduit; also, that stop-cocks have been connected with hose-reels and automatically opened and closed by a device connected with the reel-engaging arms attached to the stop-cock, the construction being such that the reel may be thrown out of connection with the stop-cock in winding up the hose, and hence I would have it understood that I make no claim to such devices. In my improvement gearing is employed for transmitting the rotary motion of the reel to a reciprocating valve, and when the reel is rotated to wind up the hose the gearing is thrown out of connection with the reel.

I claim as my invention—

1. The combination, substantially as hereinbefore set forth, of the hose-reel, the water-supply pipe, the water-supply valve, mechanism for automatically operating the valve by the rotation of the reel, and a detachable connection between the automatic mechanism and the valve, by which the latter may be actuated either automatically by the movement of the reel or by hand.

2. The combination, substantially as hereinbefore set forth, of the hose-reel, the water-supply valve, a wheel, G, actuated by the rotation of the reel to automatically operate the valve, the hand-wheel for operating the valve, and the detachable clutch or connection between the hand-wheel and the automatically-actuating wheel.

3. The combination, substantially as hereinbefore set forth, of the hose-reel, the water-supply pipe, the water-supply valve, the valve-stem, the wheel G, for automatically operating the valve by the revolution of the reel, the hand-wheel sliding on the valve-stem, and the pins thereon for engagement with the wheel G.

4. The combination, substantially as hereinbefore set forth, of the hose-reel, the water-supply pipe constituting one of its bearings, the gear-wheel turning freely on the reel-shaft, detachable driving-connections between the reel and said gear-wheel, (which connections automatically engage when released by the unwinding of the hose from the reel,) the water-supply valve, and the second gear-wheel, actuated by the first one and turning with the valve-stem, to open the valve automatically as the hose is unwound from the reel.

5. The combination, substantially as hereinbefore set forth, of the hose-reel, the water-supply pipe constituting one of its bearings, the actuating gear-wheel, detachable driving-connections between the hose-reel and gear-wheel, the water-supply valve mounted upon its stem, and the detachable connection between the valve-stem and gear-wheel to actuate the latter either automatically by the unwinding of the hose or by hand, as preferred.

6. In a hose-reel, the combination of the reel, water-supply pipe, globe-valve for regulating the supply of water to the hose, and gearing with devices connected with the reel, and adapted to engage and actuate said gearing when the hose is unwound from the reel, and automatically and gradually raise the valve from its seat and admit water to the hose, substantially as set forth.

7. In a hose-reel, the combination, with the reel, water-supply pipe, valve for regulating the supply of water to the hose, and gearing, of devices connected with the reel and adapted to operate the gearing connected with the valve when the hose is unwound, and for disconnecting the gearing and reel when the latter is rotated in the opposite direction, substantially as set forth.

8. In a hose-reel, a globe-valve and spring-detents arranged to engage the reel, in combination with gearing operating the globe-valve only when the reel is turned in the direction to unwind the hose, substantially as set forth.

In testimony whereof I have hereunto subscribed my name this 18th day of January, A. D. 1883.

LEVI W. STOCKWELL.

Witnesses:

CHAS. H. DORER,
ALBERT E. LYNCH.